(12) United States Patent
Helfenstein et al.

(10) Patent No.: US 8,094,054 B2
(45) Date of Patent: Jan. 10, 2012

(54) TRANSMITTER WITH DELAY MISMATCH COMPENSATION

(75) Inventors: Markus Helfenstein, Lucerne (CH); Alexander Lampe, Leipzig (DE)

(73) Assignee: ST-Ericsson SA, Plan-Les-Ouates (CH)

( * ) Notice: Subject to any disclaimer, the term of this patent is extended or adjusted under 35 U.S.C. 154(b) by 111 days.

(21) Appl. No.: 12/678,010

(22) PCT Filed: Mar. 19, 2007

(86) PCT No.: PCT/IB2007/050953
§ 371 (c)(1),
(2), (4) Date: Mar. 12, 2010

(87) PCT Pub. No.: WO2007/110805
PCT Pub. Date: Oct. 4, 2007

(65) Prior Publication Data
US 2010/0302083 A1 Dec. 2, 2010

(30) Foreign Application Priority Data
Mar. 28, 2006 (EP) .................................. 06300292

(51) Int. Cl.
*H03M 1/66* (2006.01)
(52) U.S. Cl. ........................... 341/144; 375/296
(58) Field of Classification Search .................. 375/298, 375/296, 297; 341/117–120, 144
See application file for complete search history.

(56) References Cited

U.S. PATENT DOCUMENTS

| | | | | |
|---|---|---|---|---|
| 5,191,597 A | * | 3/1993 | Ekelund et al. | ............... 375/298 |
| 6,240,144 B1 | * | 5/2001 | Ha | ................. 375/297 |
| 6,587,513 B1 | * | 7/2003 | Ichihara | ....................... 375/296 |
| 6,654,426 B2 | * | 11/2003 | Lagerblom et al. | ........... 375/296 |
| 6,670,900 B1 | | 12/2003 | Zhang | |
| 6,931,343 B2 | * | 8/2005 | Webster et al. | ................ 702/107 |
| 2001/0055957 A1 | | 12/2001 | Doetsch et al. | |
| 2002/0024398 A1 | * | 2/2002 | Lagerblom et al. | ........... 332/103 |
| 2003/0158878 A1 | | 8/2003 | Abe | |
| 2004/0001413 A1 | | 1/2004 | Suyama | |
| 2004/0193965 A1 | | 9/2004 | Coersmeier | |
| 2005/0105642 A1 | * | 5/2005 | Muller et al. | .................. 375/296 |
| 2006/0008030 A1 | | 1/2006 | Luke et al. | |

FOREIGN PATENT DOCUMENTS

| | | | |
|---|---|---|---|
| JP | 2000299652 A | | 10/2000 |
| WO | 2004/082232 A1 | | 9/2004 |
| WO | 2005101675 A2 | | 10/2005 |

\* cited by examiner

*Primary Examiner* — Jean Jeanglaude

(74) *Attorney, Agent, or Firm* — Potomac Patent Group PLLC

(57) ABSTRACT

A transmitter device comprises a digital part and an analog part. The digital part comprises a digital modulator for receiving bits and for digitally modulating the received bits. The transmitter device includes first and second digital-to-analog converters. The transmitter device furthermore comprises at least one filter unit arranged in the digital part and coupled between at least one of the first and second digital-to-analog converters and the digital modulator. A table unit is coupled to the at least one filter unit and is used to store pre-defined compensation filter values for the at least one filter unit to compensate different delay mismatches in the analog part of the transmitter device. The filter values of the at least one filter unit are set to those compensation filter values as stored in the table unit (TU) which correspond to a determined delay mismatch.

15 Claims, 9 Drawing Sheets

TRANSMITTER WITH DELAY MISMATCH COMPENSATION

FIELD OF THE INVENTION

The present invention relates to a transmitter device, a method for controlling a transmitter device and an electronic signaling device.

BACKGROUND OF THE INVENTION

If a transmitter, in particular a wireless transmitter transmits a baseband signal from a digital modulator through an analog section and RF section to the antenna, impairments such as amplitude and delay mismatch may occur which in turn can lead to distortion. A delay mismatch between the in-phase and the quadrature component of the transmit signal may result from systematic sampling-time errors in a digital-to-analog converter DAC or phase misalignment in the low pass post-filters due to process drift or design asymmetry. Similarly, in systems with polar loop modulators a delay mismatch between amplitude and phase may be present due to a misalignment in the analog components.

An image rejection, which constitutes a measure of signal quality in GSM/EDGE systems, can be used to accurately subsuming an amplitude as well as a phase distortion. For GSM/EDGE baseband transmitters the lower limit of image rejection, which is commonly around 40 dB at a frequency of 67 kHz, can be derived among others from the limits of the GMSK phase errors, EDGE error vector magnitude and signal amplitude ripple as described in 3GPP TS 45.05, Radio transmission and reception, V4.3.0, Release 4, 3GPP, April-2001.

EP 1 376 567 relates to a compensation of an amplitude and phase mismatch in the baseband part of a receiver for quadrature modulated signals. Estimates for those distortions are derived by measuring the power and correlations in the baseband signal resulting from the injection of a calibration signal into the RF front. U.S. Pat. No. 6,670,900 relates to a compensation for an amplitude and phase mismatch in the baseband part of a transmitter for an OFDM (orthogonal frequency division multiplex) signal. Estimates for the amplitude and phase mismatch are derived for each single sub-carrier by means of calibration signals. However, none of these documents relate to compensation of a delay mismatch.

The one way to solve the problem of a delay mismatch is to design the analog signal path such that the limits of the design are fulfilled, i.e. all components have very tight variations relatively to each other such that the mismatch doesn't exceed certain thresholds. Such an approach is the standard approach for the transmit path of a base band section in mobile communication systems. However, as it is usually quite difficult within a mass production to fulfill these requirements, other approaches are required.

OBJECT AND SUMMARY OF THE INVENTION

It is therefore an object of the invention to provide an electronic device with a reduced delay mismatch even if the device is a mass production device.

Therefore, a transmitter device is provided which comprises a digital part and an analog part. The transmitter device furthermore comprises a digital modulator in the digital part for receiving bits and for digitally modulating the received bits. A first and second digital-to-analog converter is provided. The transmitter device furthermore comprises at least one filter unit which is arranged in the digital part and which is coupled between the first and/or second digital-to-analog converter and the digital modulator. A table unit is coupled to the at least one filter unit and is used to store predefined compensation filter values for the at least one filter unit which are required to compensate different delay mismatches in the analog part of the transmitter device. The filter values of the at least one filter unit are set to those compensation filter values as stored in the table unit which correspond to a determined delay mismatch.

Accordingly, a transmitter device is provided which is able to compensate for different delay mismatches in the analog part of a transmitter device by adjusting the filter values of the filter units. Therefore, such a device can be produced in a mass production as any mismatch in the analog part can be compensated accordingly.

According to an aspect of the invention, the digital modulator receives at least a digital signal and outputs a digital in-phase signal and at least a digital quadrature signal. The first converter converts the digital in-phase signal to an analog in-phase signal, and the second converter converts the digital quadrature signal to an analog quadrature signal.

According to a preferred aspect of the invention, the filter unit comprises a first order all pass filter with a pole and zero constellation which is tunable according to the compensation filter values stored in the table unit. Therefore, a transmitter device is provided which can compensate for delay mismatches in its analog part by selecting the pole and zero constellation of the filter units according to those values stored in the table unit, whereby a flexible transmitter device is provided.

According to a further aspect of the invention, the digital modulator receives a digital signal and outputs a digital amplitude signal and a digital phase signal. The first converter converts said digital amplitude signal to an analog amplitude signal and the second converter converts the digital phase signal to an analog phase signal. The filter unit is coupled between the digital phase output of the modulator and the second converter. Accordingly, a transmitter device is provided which is based on a polar loop modulator.

The invention also relates to a method for controlling a transmitter device. The transmitter device comprises a digital and an analog part, a digital modulator, a first and second digital-to-analog converter and at least a filter unit coupled between the first and/or second digital-to-analog converter and the digital modulator. The received bits are digitally modulated. Pre-defined compensation filter values which are required to compensate for different delay mismatches in the analog part of the transmitter device are stored. The filter values of the at least one filter unit are set to those stored compensation filter values which correspond to a determined delay mismatch.

The invention further relates to an electronic signaling device which comprises a digital part and an analog part. The signaling device furthermore comprises a first and second digital-to-analog converter. The signaling device furthermore comprises at least one filter unit which is arranged in the digital part and which is coupled between a first and/or second terminal and the first and/or second digital-to-analog converter. A table unit is coupled to the at least one filter unit and is used to store predefined compensation filter values for the at least one filter unit which are required to compensate different delay mismatches in the analog part of the signaling device. The filter values of the at least one filter unit are set to those compensation filter values as stored in the table unit which correspond to a determined delay mismatch.

The invention relates to the idea to compensate a delay mismatch in an analog part of the device by introducing a digital phase shift to provide a pre-distortion the digital part to compensate for the delay mismatch. In order to limit the amplitude and delay mismatch in the analog signals I(t), \I(t), Q(t), \Q(t) to a maximum degree or equivalently to guarantee a minimum IR, the actual amplitude and delay mismatch is measured as described below or by other means, e.g., off-line during production, and the determined delay values are stored in a table later accessible during operation. The amplitude mismatch can be compensated as described below and the delay mismatch is compensated as proposed in the sequel.

To determine the delay mismatch in the analog part of the device, test signals are used which can be generated with the modulator being inherent to the transmit path. Based on the measurements the distortions in the analog part of the transmit signal path are compensated by means of predistortion introduced to the signal in the digital part of the transmit path. In particular, the signal delay of the transmit signal's in-phase and quadrature component are changed relative to each other by means of digital signal processing. Similarly this could also be applied to modulators using amplitude and phase signals instead of in-phase and quadrature phase, i.e. so-called polar loop modulators.

The embodiments as well as the advantages of the invention will now be described in more detail with respect to the drawings.

DESCRIPTION OF EMBODIMENTS

Figure 1:
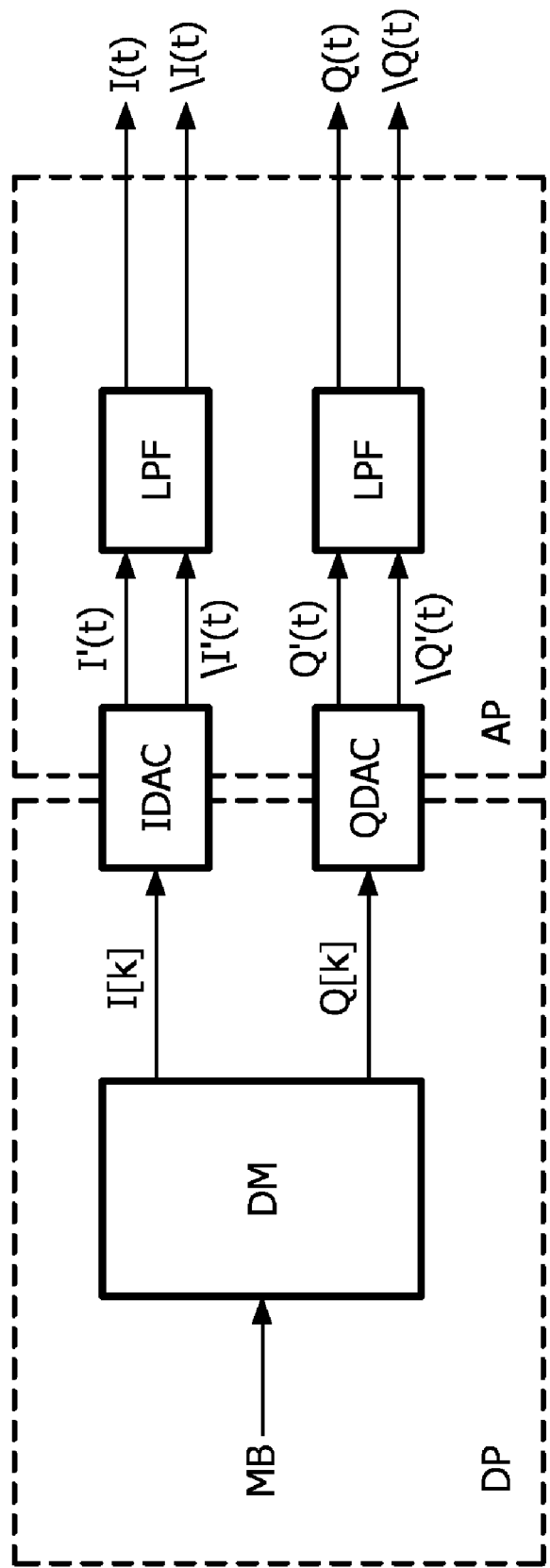
FIG. 1 shows a block diagram of a digital and analog baseband transmitter.

FIG. 1 shows a block diagram of a digital and analog baseband transmitter. The transmitter TX comprises a digital part DP and an analog part AP. The digital part receives modulating bits MB as inputs and the analog part outputs the in-phase signals I(t), \I(t) and the quadrature signal Q(t); \Q(t). The transmitter basically comprises a digital I/Q modulator DM which receives the modulating bits MB and outputs a modulated digital in-phase signal I[k] and a quadrature signal Q[k]. The modulated digital in-phase signal I[k] is forwarded to an in-phase digital-to-analog converter IDAC and the quadrature signal Q[k] is forwarded to the quadrature digital-to-analog converter QDAC. The in-phase digital-to-analog converter IDAC outputs the differential analog in-phase signals I'(t) and \I'(t). The quadrature digital-to-analog converter QDAC outputs the differential quadrature signals Q'(t) and \Q'(t). The differential analog signals are input to a low pass filter LPF, respectively, such that signal replicas at multiples of the digital sampling frequency are removed.

Therefore, the desired analog differential signals I(t); \I(t) and Q(t); \Q(t) are achieved at the output of the analog part.

In order to illustrate the effects of delay and amplitude mismatch it is assume that the digital I/Q modulator DM generates a complex sine wave $$I[k]+jQ[k]=\exp(j2\pi f_{I/Q}/f_m \cdot k), \quad (EQ1)$$

where $f_{I/Q}$, $f_m$ and k correspond to the sine wave frequency, the sampling frequency (i.e., the frequency of the digital master clock) and the discrete time index, respectively. Then, the differential analog in-phase and quadrature signals of an ideal transmitter when neglecting the inevitable quantization error read $$I(t)=CM+A\cos(j2\pi f_{I/Q}t),$$

$$\backslash I(t)=CM-A\cos(j2\pi f_{I/Q}t),$$

$$Q(t)=CM+A\sin(j2\pi f_{I/Q}t),$$

$$\backslash Q(t)=CM-A\sin(j2\pi f_{I/Q}t). \quad (EQ2)$$

CM and A correspond to the common mode voltage of the differential signal and the amplitude of the modulated sine wave, respectively. When the above equations are subtracted, it holds for the ideal transmitter $$I(t)-\backslash I(t)=2A\cos(2\pi f_{I/Q}t,$$

$$Q(t)-\backslash Q(t)=2A\sin(2\pi f_{I/Q}t). \quad (EQ3)$$

Hence, the common mode voltage vanishes when it is equal for I(t) and \I(t) as well as Q(t) and \Q(t). Consequently, the analog I/Q signal I(t)−\I(t)+j(Q(t)−\Q(t)) describes a circle with amplitude 2A in the complex plane.

In real transmitters, impairments occur which distort the analog I/Q signal. In general, these impairments arise in the analog part AP of the transmitter due to variations of the analog components while the digital part DP is well under control of the designer.

The first problem is that the amplitudes of the analog differential I/Q signals can be different due to mismatch in the DACs or the lowpass filters. The amplitudes $A_I$, $A_{\backslash I}$, $A_Q$, $A_{\backslash Q}$ of the differential signals I(t), \I(t), Q(t), \Q(t), respectively, may be different from each other such that the nominal amplitude can be described as follows $$A_X=A+D_X, \quad (EQ4)$$

where $D_X$ designates the positive or negative deviation from the nominal value A and the sub-script X stands for the possible subscripts I, \I, Q, \Q. If the differential signals of the I and Q path are subtracted, respectively, the following is obtained $$I(t)-\backslash I(t)=(2A+D_I+D_{\backslash I})\cos(2\pi f_{I/Q}t)=A_{I,eff}\cos(2\pi f_{I/Q}t),$$

$$Q(t)-\backslash Q(t)=(2A+D_Q+D_{\backslash Q})\sin(2\pi f_{I/Q}t)=A_{Q,eff}\sin(2\pi f_{I/Q}t). \quad (EQ5)$$

The effective amplitudes $A_{I,eff}=2A+D_I+D_{\backslash I}$ and $A_{Q,eff}=2A+D_Q+D_{\backslash Q}$ of the I and Q path are different. As a consequence, the phasor of the signal now corresponds to an ellipsoid in the complex plane (instead of a circle) whose main axes lie on the real and imaginary axis. A measure for the severeness of that distortion is the so-called amplitude matching G which can be defined as $$G=\frac{A_{Q,eff}}{A_{I,eff}}. \quad (EQ6)$$

According to a second problem, which also leads to a ellipsoidal distortion, the delays of the differential signal paths may not be equal. Denoting the absolute delays of the differential signals I(t), \I(t), Q(t), \Q(t) as $\tau_I$, $\tau_{\backslash I}$, $\tau_Q$, $\tau_{\backslash Q}$, they can be expressed as $$\tau_{\backslash I} = \tau_I + \Delta\tau_{\backslash I},$$

$$\tau_Q = \tau_I + \Delta\tau_Q,$$

$$\tau_{\backslash Q} = \tau_I + \Delta\tau_Q + \Delta\tau_{\backslash Q}, \quad (EQ7)$$

when using $\tau_I$ as reference for all other delays. Assuming $\tau_I = 0$ without loss of generality for the following considerations, we get for the sum of the differential signals in the I and Q paths (G=1)

$$I(t) - \backslash I(t) = A(1 + \cos(2\pi f_{I/Q}\Delta\tau_{\backslash I}))\cos(2\pi f_{I/Q}t) - A\sin(2\pi f_{I/Q}\Delta\tau_{\backslash I})\sin(2\pi f_{I/Q}t),$$

$$Q(t) - \backslash Q(t) = A(1 + \cos(2\pi f_{I/Q}\Delta\tau_{\backslash Q}))\sin(2\pi f_{I/Q}t + 2\pi f_{I/Q}\Delta\tau_Q) + A\sin(2\pi f_{I/Q}\Delta\tau_{\backslash Q})\cos(2\pi f_{I/Q}t + 2\pi f_{I/Q}\Delta\tau_Q). \quad (EQ8)$$

It should be noted that the difference in the delays between I(t) and \I(t) as well as between Q(t) and \Q(t) is in general small compared to the difference between I(t) and Q(t), i.e., $$\Delta\tau_{\backslash I}, \Delta\tau_{\backslash Q} \ll \Delta\tau_Q \quad (EQ9)$$

when the same converter DACs and filters are used for the generation of a pair of differential signals, so that the expressions in (EQ. 8) simplifies to $$I(t) - \backslash I(t) \approx 2A\cos(2\pi f_{I/Q}t), \quad (EQ10)$$

$$Q(t) - \backslash Q(t) \approx 2A\sin(2\pi f_{I/Q}t + 2\pi f_{I/Q}\Delta\tau_Q) = 2A\sin(2\pi f_{I/Q}t + \Delta\Phi)$$

Accordingly, the phase of the quadrature signal is shifted relatively to the in-phase signal phase by a phase offset of $$\Delta\Phi = 2\pi f_{I/Q} \cdot \Delta\tau_Q \quad (EQ11)$$

Note that the particular value of the phase offset relies on the considered signal frequency $f_{I/Q}$.

As a consequence of this phase shift in the I and Q paths being caused by a time delay, the phasor of the signal describes now an ellipsoid in the complex plane (instead of a circle) whose main axes are rotated by the angle $\Delta\Phi$ relative to the real and imaginary axis.

If amplitude and delay mismatches occur (the usual case in practice), the resulting signal can be written as (the effective amplitude of the in-phase signal is normalized to A for the sake of clarity and without loss of generality)

$$I(t) - \backslash I(t) \approx 2A\cos(2\pi f_{I/Q}t),$$

$$Q(t) - \backslash Q(t) \approx 2GA\sin(2\pi f_{I/Q}t + 2\pi f_{I/Q}t \cdot \Delta\tau_Q) = 2GA\sin(2\pi f_{I/Q}t + \Delta\Phi) \quad (EQ12)$$

Therefore, the resulting phasor describes an ellipsoid in the complex plane (instead of a circle) whose main axes are rotated by the angle $\Delta\Phi$ relative to the real and imaginary axis.

The resulting complex signal I(t)−\I(t)+j(Q(t)−\Q(t)) in detail, it can be written as ((x)* designates the complex conjugate of x)

$$I(t) - \backslash I(t) + j(Q(t) - \backslash Q(t)) = 2AB(\cos(2\pi f_{I/Q}t) + j\sin(2\pi f_{I/Q}t)) + 2AC(\cos(2\pi f_{I/Q}t) + j\sin(2\pi f_{I/Q}t))^*, \quad (EQ13)$$

with $$B = (1 + G\cos(\Delta\Phi) + jG\sin(\Delta\Phi))/2,$$

$$C = (1 - G\cos(\Delta\Phi) + jG\sin(\Delta\Phi))/2. \quad (EQ14)$$

Hence, the resulting complex signal is the superposition of the ideal signal weighted by B and the complex conjugate of the ideal signal weighted by C. As the relative strength of the complex conjugate signal (the so-called image signal) to the ideal signal is directly related to both of those distortions, they can be quantified by means of the image rejection being defined as $$IR \equiv \frac{|B|^2}{|C|^2} = \frac{G^2 + 2G\cos(\Delta\phi) + 1}{G^2 - 2G\cos(\Delta\phi) + 1} \quad (EQ15)$$

Having described the effects of delay and amplitude mismatch, subsequently a delay mismatch compensation is described.

Figure 2:
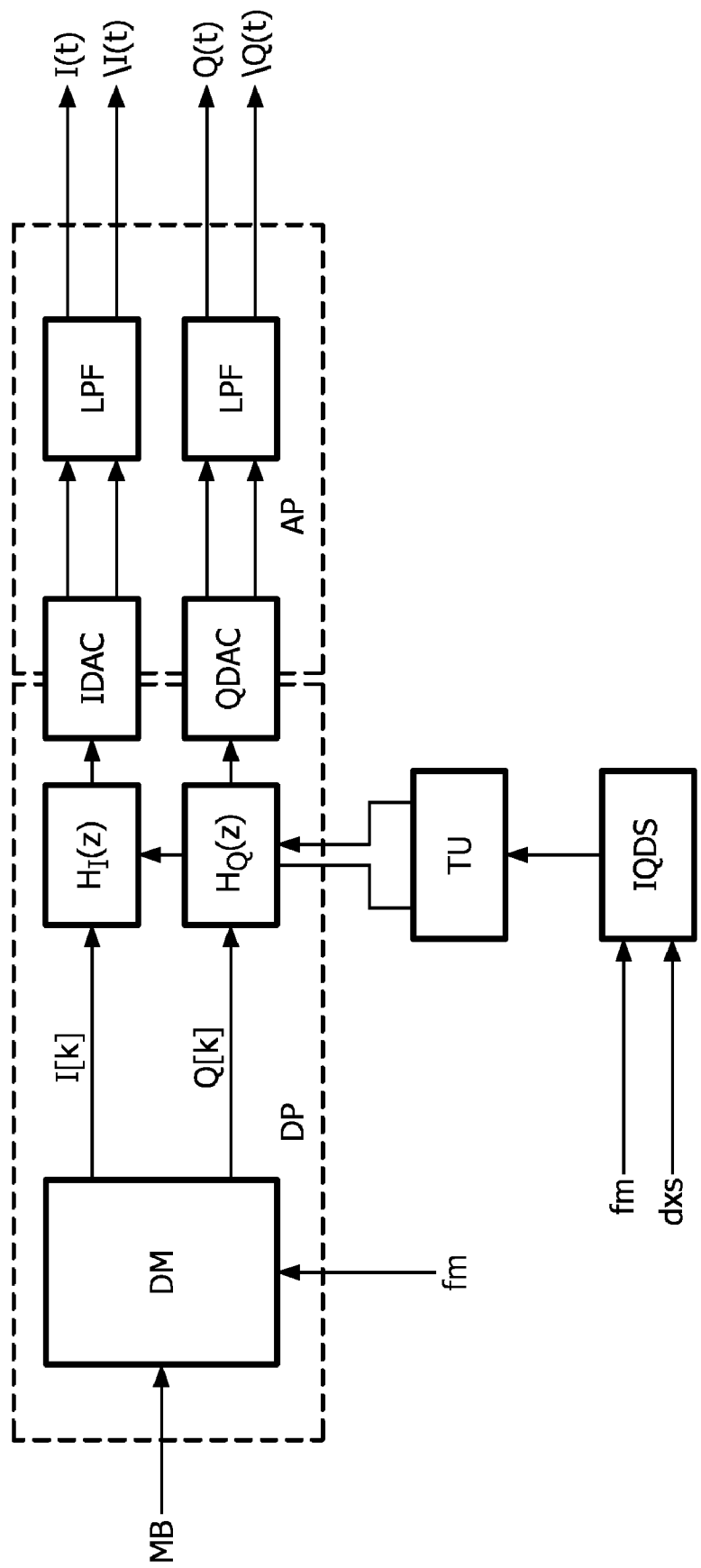
FIG. 2 shows a block diagram of a digital and analog baseband transmitter with a delay mismatch compensation according to a first embodiment.

FIG. 2 shows a block diagram of a baseband transmitter according to the first embodiment. In addition to the elements as depicted in FIG. 1, the transmitter furthermore comprises an in-phase filter unit $H_I(z)$ which is coupled between the digital modulator DM and the in-phase digital-to-analog converter IDAC. A quadrature filter unit $H_Q(z)$ is coupled between the digital modulator DM and the quadrature digital-to-analog converter QDAC. A table unit TU is coupled to the two filter units $H_I$, $H_Q$ while the table unit TU is in turn coupled to a I/Q delay unit IQD and a X selector unit XS. The I/Q delay unit IQD receives a master clock $F_m$ as input and the X selector unit receives a delay X selector as input.

These filters $H_I$, $H_Q$ are used for compensating an estimated delay mismatch into both, the I[k] and the Q[k] signal path, respectively. The filter requirements of these filters should be flat in amplitude and phase response but linearly tunable in group delay, thereby allowing to adjust for delay mismatch.

As described in "Discrete-Time Signal Processing", by A. V. Oppenheim, R. W. Schaefer Pretice Hall, New Jersey, 1999 a stable function of the form $$H(z) = \frac{1 - za^*}{z - a} \quad (EQ16)$$

has a magnitude response $$|H(z = \exp(j\omega))| = 1, \forall \omega. \quad (EQ17)$$

Hence, the magnitude response is independent of the radian frequency $\omega = 2\pi(f_{I/Q}/f_m)$ and therefore identical for all frequencies of the I/Q signal. This first order filter is well described in literature and referred to as all-pass since the filter passes all frequency components with equal gain, e.g., 0 dB for a system without gain. With a expressed in polar form $a = r\exp(j\theta)$, the phase response $\angle[.]$ of a first order all-pass section (EQ. 16) can be found as $$\angle[H(z = \exp(j\omega))] = \angle\left[\frac{\exp(-j\omega) - r\exp(-j\theta)}{1 - r\exp(j(\theta - \omega))}\right] = -\omega - 2a\tan\left[\frac{r\sin(\omega - \theta)}{1 - r\cos(\omega - \theta)}\right]. \quad (EQ18)$$

Moreover, the group delay grd[.] of a transfer function is defined as $$grd[H(z = \exp(j\omega))] = -\frac{d}{d\omega}\{\angle[H(z = \exp(j\omega))]\} = \tau \quad (EQ19)$$

and can be shown to be for the first order all-pass section given in (EQ. 16)

$$\tau = -\left\{-1 - 2\frac{r\cos(\omega - \theta) - r^2}{1 + r^2 - 2r\cos(\omega - \theta)}\right\} = \frac{1 - r^2}{1 + r^2 - 2r\cos(\omega - \theta)}. \quad \text{(EQ20)}$$

For $f_{I/Q} \ll f_m$, i.e., $\omega \approx 0$, and $\theta = \pi$, i.e., $a = -r$, (EQ. 20) comes close to $$\tau = \frac{1 - r^2}{1 + r^2 - 2r\cos(\omega - \theta)} \approx \frac{1 - r^2}{1 + r^2 - 2r} = \frac{1 - r}{1 + r}. \quad \text{(EQ21)}$$

Hence, for low frequency signals and this particular choice of $\theta$, the group delay is independent of the signal frequency but dependent on the pole/zero constellation of the all-pass section and thereby tunable. Note that (EQ. 21) is only a qualitative mean to discuss the all-pass section in the vicinity of low frequency input signals but not a quantitative measure. Of course, results are more accurate for small values of w.

In particular, the compensation works as follows. A first order all-pass filter section $$H(z) = \frac{1 + zr}{z + r} \quad \text{(EQ22)}$$

with tunable pole/zero constellation is clocked by a master clock signal with frequency $f_m$, (for example fm=4.333 MHz for the PCF5213 GSM/EDGE BB chip). The all-pass is attached to a ROM table TU with pre-defined delay mismatch parameters and the delay selector is set according to calibration measurements done similar as described below or by employing off chip calibration means. Alternatively, a RAM table can be used to directly store the filter values attained during production calibration.

The granularity of delays which can be introduced in this way, and thereby the remaining overall path delay mismatch after compensation, is adjustable by choice of the pole/zero constellation. Note that this improvement goes without increasing the master clock frequency When choosing $r \in [0.5, 0.95]$ with step size $\Delta r = 0.05$, delays $\tau$ in the interval $[0.026 \ldots 1/3]$ samples or $[0.026 \ldots 1/3]/f_m = [6 \ldots 77]$ ns can be compensated. The granularity $\Delta\tau$ of this compensation is smaller than 0.027 samples or $0.027/f_m = 6.24$ ns.

Hence, using this particular pole/zero constellations given in (EQ. 23), the maximum remaining delay mismatch after compensation is therefore at most 6 ns. However, the accuracy could be improved without effort to the pico seconds range.

One possibility to integrate an all-pass section is to use an IIR-type implementation, either in direct form I or II, as described in "Discrete-Time Signal Processing, by A. V. Oppenheim, R. W. Schaefer Pretice Hall, New Jersey, 1999, which is herein incorporated by reference. However, for quantization noise, limit cycles, architectural reasons, one may also consider FIR-type approximations of the IIR prototype filter.

Figure 3:
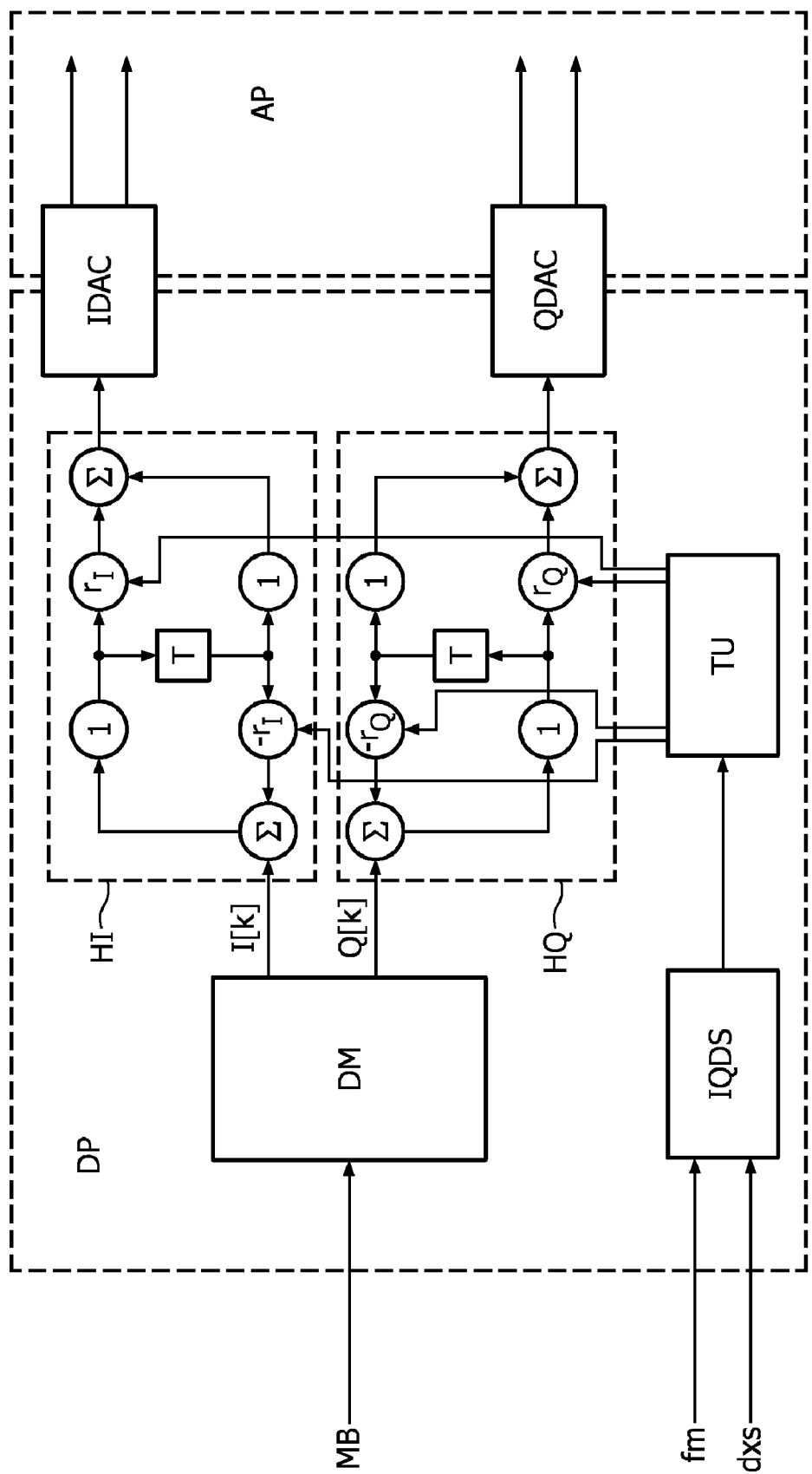
FIG. 3 shows a block diagram of a digital and analog baseband transmitter according to a second embodiment.

The most simple solution to implement the first order all-pass sections is shown in FIG. 3, i.e., using an IIR-type topology for both, the in-phase and quadrature-phase signal path, in order to implement $$H_I(z) = \frac{1 + zr_I}{z + r_I}, \quad H_Q(z) = \frac{1 + zr_Q}{z + r_Q}. \quad \text{(EQ23)}$$

Thereby, the values of $r_I, r_Q$ are to be chosen from a RAM/ROM table TU such that the measured delay between the in-phase and quadrature path is compensated.

FIG. 3 shows a block diagram of a baseband transmitter according to the second embodiment. The baseband transmitter comprises a digital I/Q modulator DM which receives the modulating bits MB. The in-phase and quadrature outputs I[k], Q[k] are coupled to an in-phase digital-to-analog converter IDAC and a QDAC via the filter unit $H_I(z)$ and $H_Q(z)$, respectively. The transmitter furthermore comprises a table unit TU and a I/Q delay unit IQD and a X selector unit XS. The filter units $H_I(z)$ and $H_Q(z)$ are implemented according to EQ 23. Here, the filter units are implemented in the time domain and T relates to the delay of one sampling instant. The filter coefficients $r_I$, $r_Q$ are stored in the table unit TU which can be implemented as a RAM/ROM. By selecting a desired pole/zero constellation a delay mismatch in the analog part can be compensated.

Figure 4:
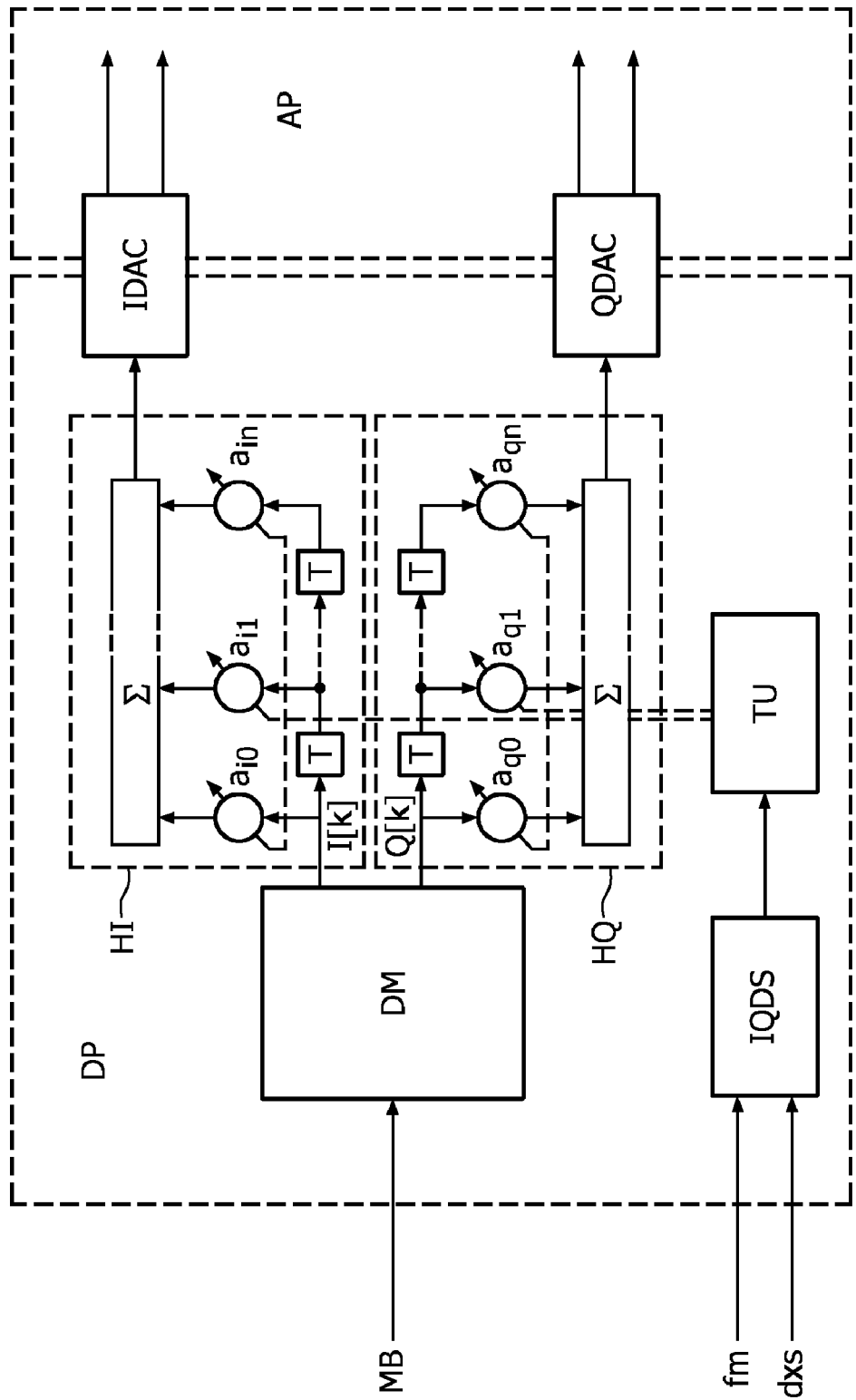
FIG. 4 shows a block diagram of a digital and analog baseband transmitter according to a third embodiment.

FIG. 4 shows a block diagram of a baseband transmitter according to the third embodiment. The baseband transmitter according to the third embodiment substantially corresponds to the baseband transmitter according to the second embodiment, wherein the filter units $H_I(z)$ and $H_Q(z)$ are implemented using a FIR topology.

The transmitter according to the third embodiment is implemented based on the integration of a first order all-pass section in order to approximate the step response of the prototype filter with a FIR section of length L depending on the chosen accuracy.

One possibility of approximating a known IIR filter by an FIR type topology of unknown length L is to minimize the squared difference of the impulse responses with coefficients $a_{i0} \ldots a_{in}$ and $a_{q0} \ldots a_{qn}$, for the FIR filter in the in-phase and quadrature path, respectively, while increasing the FIR filter length L until the error criteria is fulfilled. Here, the error criteria has to be fulfilled for $r \in [0.5, 0.95]$ with step size 0.05. With a MATLAB routine it can be shown that a filter of order L=80 is needed to achieve an image rejection of IR=50.8 dB for G=1.002, and L=160 to arrive at the same performance as in the IIR case.

The advantage of choosing a FIR implementation over an IIR implementation is that neither stability nor limit cycle problems can occur. However, the penalty to be paid is somewhat larger chip area.

It should be noted that the $C_0$, $C_1$ FIR filter of the GMSK/8PSK modulator can be combined with the FIR filter for delay compensation via a simple convolution operation.

Figure 5:
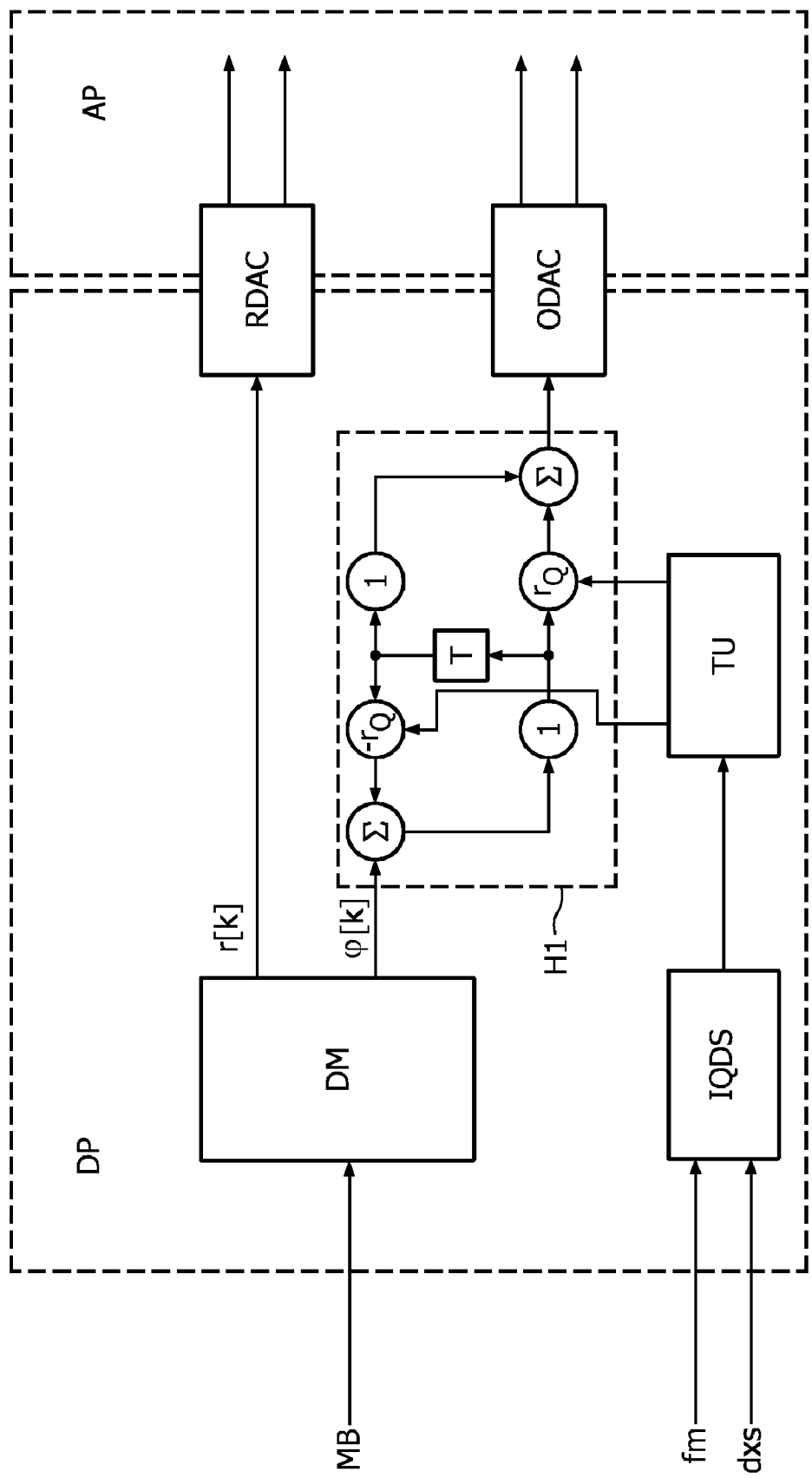
FIG. 5 shows a block diagram of a digital and analog baseband transmitter according to a fourth embodiment.

FIG. 5 shows a block diagram of a baseband transmitter according to the fourth embodiment. Here, the digital modulator DM is implemented for polar loop modulation. As there is a one-to-one correspondence between the I/Q and r/φ-domain, modulators as well as the compensation circuitry can be built in one domain or the other.

This conversion can done via standard trigonometric formulas and reads for digital signals $$r[k] = \sqrt{(I[k])^2 + (Q[k])^2}$$

$$\phi[k] = \arctan(Q[k]/I[k]) \quad \text{(EQ24)}$$

The digital amplitude $r[k]$ and phase $\phi[k]$ are converted into the corresponding analog signals $r(t)$ and $\phi(t)$ by using standard DACs with the appropriate resolution.

As for analog I/Q signals (i.e. in the analog part AP), a delay mismatch between the analog amplitude and phase signal paths may occur. Assuming without loss of generality that an additional erroneous delay $\Delta\tau_\varphi$ is introduced in the phase signal path, a phase mismatch $\Delta\Phi(t)$ occurs whose magnitude is directly proportional to $\Delta\tau_\varphi$ $$\Delta\phi(t) = \frac{\partial}{\partial t}\varphi(t) \cdot \Delta\tau_\varphi. \quad (EQ25)$$

For an EDGE modulation, a spectral broadening of the transmit signal and an error vector between the ideal and real transmit signal may occur. In order to keep these distortions small so that no performance degradation due to these distortions occurs, the delay mismatch $\Delta\tau_\varphi$ has to be smaller than one percent of a symbol interval, i.e. smaller than about 37 ns.

This can be achieved by applying appropriately the delay mismatch procedure as described above. The modulator can either be of I/Q-type with an additional r/φ-conversion or directly of a r/φ-type. Again, the compensation values are stored in a RAM/ROM table TU and calculated as described above.

Figure 6:
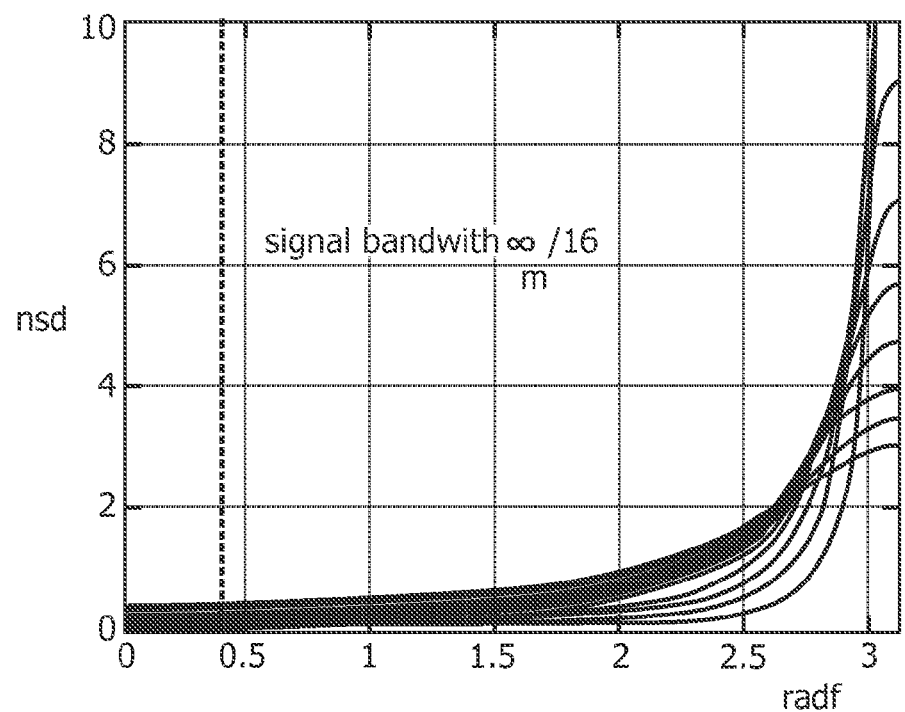
FIG. 6 shows a graph of a delay of a IIR filter.

FIG. 6 shows the simulated group delay of a first order IIR allpass section with parameters r∈[0.5, 0.95] and step size 0.05. The depicted simulation results indicate the functioning of the principles of the invention. All simulations were done using MATLAB for r∈[0.5, 0.95], θ=π and step size 0.05. The horizontal axis relates to the radian frequency radf and runs up to the Nyquist frequency $f_m/2$ and the vertical axis is a linear scale in terms of delay in samples nsd. More specifically, one sample delay denotes to a delay of $1 \cdot (1/f_m) = 1/(4.33$ MHz$) = 231$ ns. The vertical dashed line marks the signal bandwidth used, i.e. $f_m/16 = 270$ kHz.

Figure 7:
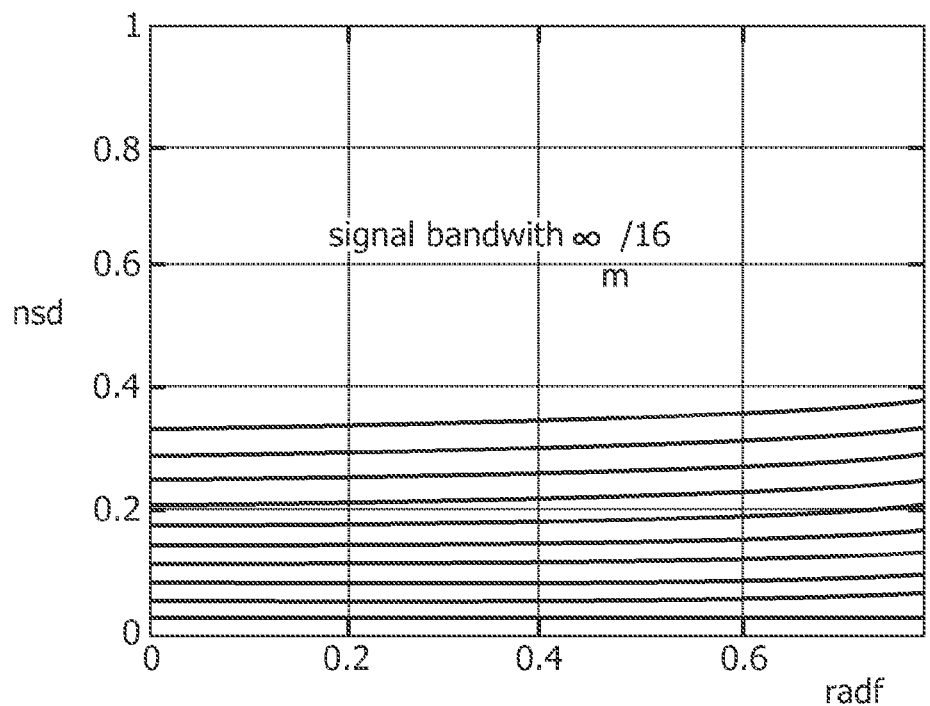
FIG. 7 shows an enlarged part of the graph of FIG. 6.

FIG. 7 shows a enlargement of the graph of FIG. 6. In particular, the flatness of the group delay up to the signal bandwidth is clearly depicted. Accordingly, EQ.22 is validated.

Figure 8:
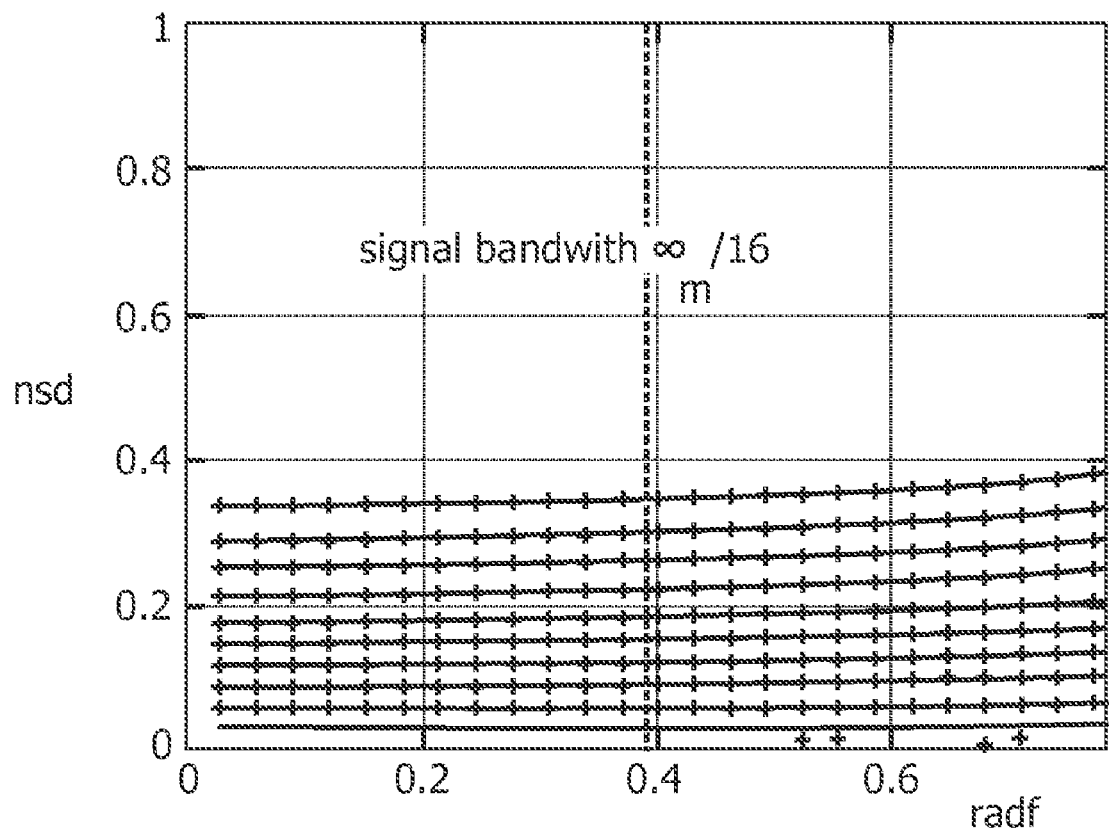
FIG. 8 shows an enlarged part of the graph of FIG. 6.

FIG. 8 shows a graph of the FIG. 7 for a FIR/IIR approximation. The FIR/IIR approximation has a length of L=80. The solid line is given as a reference and points to the IIR filter while the result of the FIR approximation are also depicted. Finally, the crosses seen at the bottom show the result close to the unity circle where the approximation fails for the filter length proposed. This is also the reason why the image rejection calculated in the previous section was superior in the IIR case. However, as stated earlier, the situation could be improved by increasing the filter length up to L=160 taps.

The group delay of IIR filter for normalized frequencies up to $f_m/8$ and parameters r∈[0.5, 0.95], θ=π with step size 0.05. The signal bandwidth under consideration is 270 kHz, i.e. up to $f_m/16$.

In the following a method for measuring the actual amplifying and delay mismatch is described in detail. According to the results of the measured delay mismatch, the delay mismatch is compensated as described above.

Figure 9:
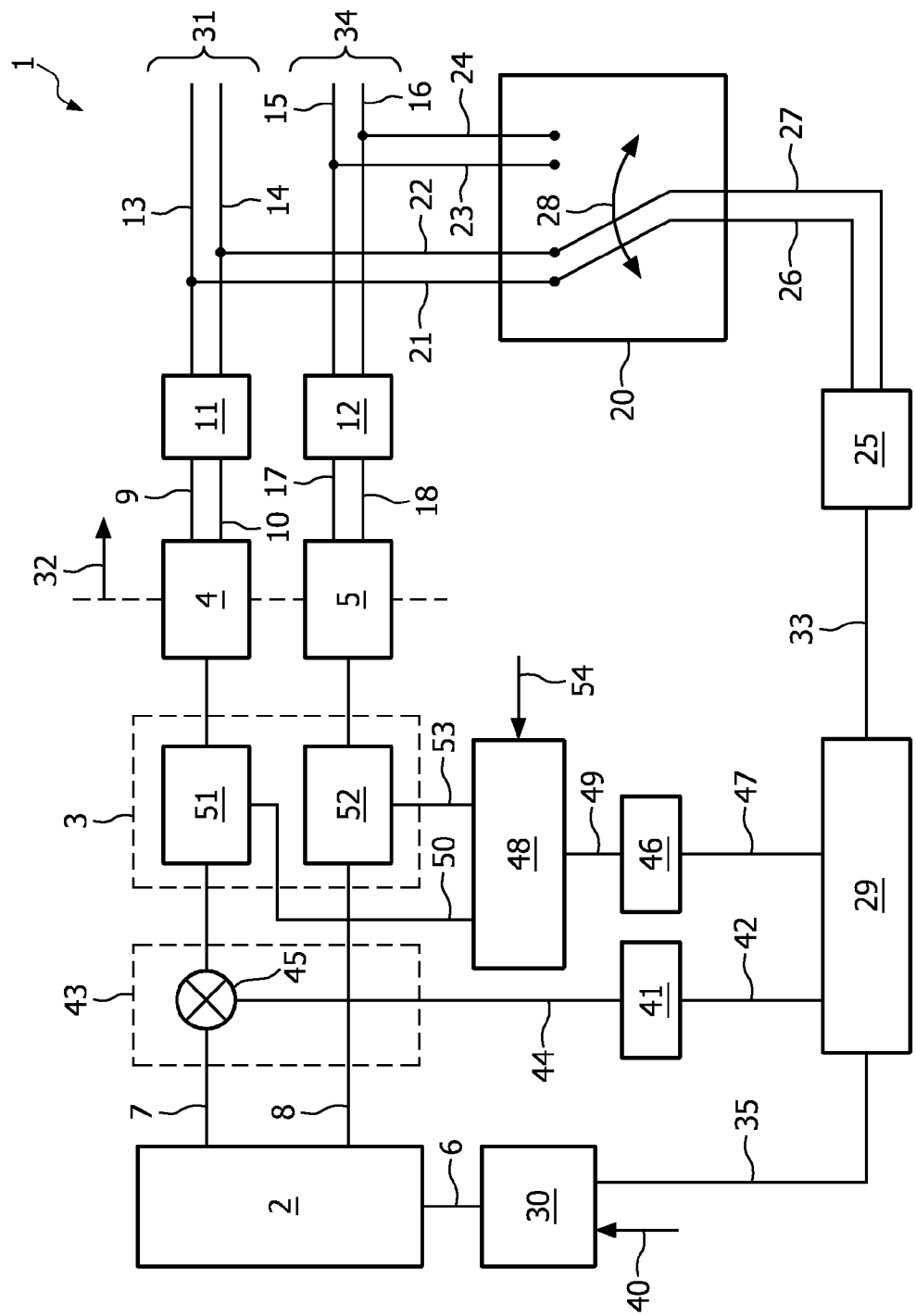
FIG. 9 shows a transmitter device according to a fifth embodiment.

FIG. 9 shows a schematic structure of a transmitter apparatus 1 according to the fifth embodiment of the invention. The transmitter apparatus 1 can be used for wireless communications systems like Global System for Mobile Communications (GSM) or Enhanced Data Rates for GSM Evolution (EDGE).

The transmitter apparatus 1 comprises a digital modulator 2, a delay unit 3, a first digital-to-analog converter 4 and a second digital-to-analog converter 5. The modulator 2 is adapted to receive a digital signal over a line 6 and to convert the signal received in a digital in-phase signal over line 7 to the DAC 4 and a digital quadrature signal over the line 8 to a DAC 5. The converter 4 is adapted to convert the digital in-phase signal in a first analog in-phase signal and a second analog in-phase signal, which first and second analog in-phase signals are output over lines 9, 10 to low pass filters 11. Thereby, the two coupled low pass filters 11 are used for filtering the analog in-phase signals. The converter 5 is adapted to convert the digital quadrature signal into a first analog quadrature signal and a second analog quadrature signal, which first and second analog quadrature signals are output over lines 17 and 18 to low pass filters 12. Thereby, the two coupled low pass filters 12 are used for filtering the analog in-phase signals. It is advantageous to convert the digital in-phase signal and the digital quadrature signal in first and second analog signals, respectively, to take care of a common mode voltage. Thereby, it is advantageous that a half of the difference between the first and the second signal yields the value of the analog signal. But, it is also possible that the converter 4 outputs only a signal over a single line and that the converter 5 is adapted to output only a signal over a single line. The low pass filters 11, 12 are adapted to remove signal replicas at multiples of the digital sampling frequency so that the desired analog differential signals are output over lines 13 to 16. These signals output over lines 13 to 16 are baseband signals.

As mentioned above, when generating the baseband signals in the transmitter apparatus 1 several impairments may occur and can lead to distortions of the signals. In particular, mismatches between the amplitudes and the delays of the in-phase and quadrature components of the signal result in an image of the signal. This problem may arise due to variations of analog components like the low pass filters 11, 12 required after the digital-to-analog converters 4, 5. In order to guarantee a certain signal quality the above mentioned impairments must not exceed certain limits.

The transmitter apparatus 1 furthermore comprises a multiplexer 20. The multiplexer 20 is connected with lines 21, 22 to the lines 13, 14 to receive the in-phase signal consisting of the first in-phase signal and the second in-phase signal. The multiplexer 20 is connected via lines 23, 24 with the lines 15, 16 to receive the quadrature signal consisting of the first quadrature signal and the second quadrature signal. The multiplexer 20 is adapted to feed either the analog in-phase signal or the analog quadrature signal to an further analog to digital converter 25, wherein in one switching position the line 21 is connected over the multiplexer 20 with a line 26 and the line 22 is connected with a line 27, and in another switching position the line 23 is connected with the line 26 and the line 24 is connected with the line 27. The switching of the multiplexer 20 is shown by a double arrow 28. Hence, the multiplexer 20 feeds either the analog in-phase signal or the analog quadrature signal to the third converter 25.

The analog to digital converter 25 is arranged to convert the analog in-phase signal to a digital in-phase measuring signal and to output this digital in-phase measuring signal to a calculation unit 29 over a line 33. Further, in the other switching position of the multiplexer 20, the converter 25 converts the analog quadrature signal to a digital quadrature measuring signal and outputs this digital quadrature measuring signal to the calculation unit 29.

The transmitter apparatus 1 further comprises a test signal generating unit 30 for generating a digital test signal. The test signal generated is fed to the digital modulator 2 over a line 6. At a first time instant a first test signal is generated and converted by the converters 4, 5 in an analog in-phase signal and an analog quadrature signal. The multiplexer 20 is in one of the switching positions 28 so that, for example, the analog in-phase signal is fed to the converter 25. Hence, a first test signal is received and stored by the calculation unit 29, wherein the digital in-phase measuring signal depends on the characteristic features of an in-phase path 31, especially an analog part 32 of the in-phase path 31.

Then, at a second time instant a further test signal comprising the same bit stream as the foregoing test signal is generated by the test signal generating unit 30. Now, the multiplexer 20 is in the other switching position so that the quadrature signal derived from the further test signal is fed to the converter 25 and received and stored as a digital quadrature measuring signal in the calculation unit 29. The form of the digital quadrature measuring signal is influenced by the quadrature path 34, especially by the analog part 32 of the quadrature path 34. The test signal generating unit 30 sends a trigger signal to the calculation unit 29 over a line 35 each time, when generating a test signal, so that the timing of the measuring signals can be compared by the calculation unit 29.

The calculation unit 29 calculates the delay mismatch and the amplitude mismatch in the in-phase and quadrature signals. Thereby, the converter 25 can convert the analog differential signals into digital single-ended signals with the sampling clock frequency that is not necessarily equal to the clock frequency of the converters 4, 5. It is also possible that the converter 25 delivers a differential digital signal, In order to obtain at least a delay value and an amplitude matching factor the modulator 2 is fed with a test signal of a periodic input bit stream so that a periodic analog in-phase and quadrature signal is generated. If a GMSK/EDGE modulator 2 is used, periodic signals with fundamental frequencies having an absolute value of 13/768 MHz, 39/768 MHz, 13/192 MHz, 65/768 MHz, etc. can be created. As described above, at least two test signals comprising such a pre-defined bit stream are supplied to the digital modulator 2. First, the analog in-phase signal is passed to the converter 25 and sampled with a sampling clock being synchronized to the modulator clock yielding the samples SI(k). Second, the analog quadrature signal is passed to the converter 25 and is sampled at the time instance defined by the trigger signal received over the line 35 yielding the samples SQ(k). Thereby, k is a positive integer counting the samples. When the sampling frequency of the converter 25 is set as a multiple of the fundamental frequencies of the periodic test signals, for example, as 13/24 MHz if for example the absolute values of the test signals frequencies are 13/192 MHz or 13/768 MHz, the in-phase signal samples SI(k) and the quadrature signal samples SQ(k) are shifted versions of each other. Assuming for example that the shift equals N samples, then the following equations are at least approximately fulfilled if the signals are passed through an appropriately chosen low pass filter to remove higher harmonics if necessary:

$$SI(k)=2AGm\cos(2\pi Fk+2\pi f\tau i+2\pi f\tau m)+ni(k),$$

$$SQ(k)=2GAGm\cos(2\pi F(k-N)+2\pi f\tau i+\Delta\Phi+2\pi f\tau m)+nq(k),$$

Thereby, A is the nominal value of the amplitude, Gm and τm designate the gain and delay of the measurement path, respectively; F is defined as the ratio of the signal frequency and the digital sampling clock frequency of the third converter 25; f is the periodic test signal frequency; and, because the measurement is focused on the relative delay difference τq−τi=ΔΦ/(2πf) between the delay τi of the in-phase path 31 and the delay τq of the quadrature path 34, the delay of the in-phase path τi can be chosen as zero without limiting the present invention. Further, ni(k) and nq(k) designate the noise interfering the measurement of the in-phase and quadrature signal, respectively.

From these equations, the amplitude matching factor G which is defined as the ratio of the effective amplitude for the quadrature part of the signal and the effective amplitude of the in-phase part of the signal, and the delay (time shift) between the measured test signals can be derived, when the samples SI(k) and SQ(k) are compared by means of the calculation unit 29.

In case that the noise interfering the samples SI(k) and SQ(k) is white Gaussian noise, a maximum likelihood estimate for the delay and amplitude of the in-phase signal can be calculated to derive Δϕ=2πfτm and Am=2 AGm. The maximum likelihood estimation for Δϕ and Am is solved as the solution to the optimization problem: (Δϕ, Am)=argmin for Δϕ and Am of the sum from k=1 up to the number of samples M over (SI(k)−Am cos(2πFk+Δϕ))^2.

With this estimates for Δϕ and Am, the maximum likelihood estimates for a ΔΦ and G are obtained from the calculation unit 29 by solving the optimization problem: (ΔΦ, G)=argmin for ΔΦ and G of the sum from k=1 up to M over (SQ(k)−G Amcos(2πFk+Δϕ+ΔΦ))^2.

Hence, an estimate for an amplitude matching factor G is obtained. Further, the maximum likelihood estimate for the path delay is obtained as a fraction value consisting of a numerator that is the estimate for 0 and an denominator that is the product of 2, and the frequency f.

When SI(k−N) approximately equals SQ(k) for all k greater or equal N and less or equal M, the amplitude matching factor G (average amplitude ratio) can be calculated by the calculation unit 29 with an alternative calculation. In this case, the amplitude matching factor G can be obtained as a fraction value consisting of a numerator which is the sum over all SI(k−N) and a denominator which is the sum over all SQ(k), wherein in both sums the index k is an integer within the range from N to M for which the absolute value of SI(k) and the absolute value of SQ(k) is not less than a threshold that has to be chosen such that merely samples with sufficiently large magnitudes are summed up so that the delay mismatch does not affect the amplitude mismatch estimate.

The delay between the in-phase path 31 and the quadrature path 34 can be found as follows. First, the samples SI(k) and SQ(k) are sliced and filtered with a low pass having a cutoff frequency that is not less than the frequency of the periodic test signal, but also not greater than two times this frequency, This yields for the in-phase signal at the low pass filter output after appropriate normalization:

$$LI(k)=\cos(2\pi Fk+2\pi f\tau m)$$ and for the quadrature signal:

$$LQ(k)=\sin(2\pi Fk+\Delta\Phi+2\pi f\tau m).$$

Thereby, LI(k) are the samples of the low pass filter output for the in-phase signal and LQ(k) are the samples for the quadrature signal. The calculation unit 29 calculates the mean of the products of LI(k) and LQ(k) over m samples out of the M samples so that the estimate for the delay of the quadrature path 34 relative to the in-phase path 31 can be calculated as a fraction value consisting of a numerator that is the sum of the product of LI(k) and LQ(k) and a denominator that is the product of m and f, wherein the sum is counted over all integers k that are greater than an appropriately chosen offset accounting, for example, for the group delay of the low pass filter, up to the sum of m and this offset.

The test signal generating unit 30 is arranged to generate test signals with different frequencies, especially different fundamental frequencies. Therefore, the test signal generating unit 30 comprises an input 40 to select the frequency of the test signal generated. Hence, the delay and amplitude mismatch can be measured and calculated for various frequencies. On the basis of the calculated delay and amplitude mismatch a delay value and an amplitude matching factor can be derived as a weighted geometric average of the maximum likelihood estimates obtained independently for the different frequencies, wherein the weights can be chosen either as all ones or, for example, according to the average signal power transmitted at their respective signal frequency. The power of the geometric average can be chosen according to a desired norm, for example, as one or two, It is also possible, that the delay and amplitude mismatch can be derived as joint maximum likelihood estimates by extending the above mentioned optimizations such that it is conducted for the various frequencies together.

Further, a test signal with vanishing frequency, that is a direct current signal, can be generated with equal amplitude on the in-phase path 31 and quadrature path 34. Therewith, the maximum likelihood estimate for the amplitude mismatch can easily be calculated by the calculation unit 29.

The result of the above-mentioned determination of the delay mismatch between the in-phase and quadrature path can be used in the first, second, third and fourth embodiment and can be stored in the table unit TU or can be used to determine the actual delay mismatch such that the filter units can be set accordingly. For determining the delay mismatch between the in-phase and the quadrature phase signal, the delay unit 3, the determination unit 48 and the amplitude correction unit 43 are not required. Therefore, the digital modulator 2, the digital-to-analog converters 4, 5 and the low pass filter 11, 12 according to the fifth embodiment substantially corresponds to the digital modulator DM, the digital-to-analog converters IDAC, QDAC and the low pass filter LPF according to the first, second and third embodiment. Accordingly, if the delay mismatch of the analog parts of the first, second, third and fourth embodiment are to be determined, the multiplexer 20, the analog to digital converter 25, the calculation unit 29 and the test signal generating unit 30 according to the fifth embodiment can be added to the circuits according to the first, second, third or fourth embodiment and the delay mismatch between the in-phase and quadrature phase path can be determined as described according to the fifth embodiment.

The transmitter apparatus 1 comprises a memory 41 for storing a quantized amplitude matching factor G calculated by the calculation unit 29. This amplitude matching factor is input to the memory 41 over a line 42 from the calculation unit 29. The amplitude matching factor G is output to an amplitude correction unit 43 over a line 44. The amplitude correction unit 43 comprises a mixer 45 which is arranged to multiply the digital in-phase signal output from the modulator 2 with the amplitude matching factor G in order to compensate for the amplitude mismatch of the transmitter apparatus 1. It is also possible, that the amplitude correction unit 43 comprises a mixer (not shown) for multiplying the digital quadrature signal output from the modulator 2 over line 8 with the reciprocal value of the amplitude matching factor. Further, the amplitude correction unit 43 can also comprise two mixers 45, to multiply both the in-phase signal output from the modulator 2 over line 7 and the quadrature signal output over line 8 with a first amplitude matching factor and a second amplitude matching factor, wherein the fraction value of the first amplitude matching factor and the second amplitude matching factor is the amplitude matching factor G calculated by the calculation unit 29.

The transmitter apparatus 1 comprises a further memory element 46 for storing a time shift value measured between the analog part 32 of the path 31 for the analog in-phase signal and the analog part 32 of the path 34 for the analog quadrature signal. The time shift value input to the memory element 46 over a line 47 from the calculation unit 29, can be positive, negative, or zero.

The time shift value is input to a determination unit 48 from the memory element 46 over a line 49. The determination unit 48 is adapted to output a first delay value over a line 50 to a first delay element 51 of the delay unit 3, and is arranged to output a second delay value to a second delay element 52 over a line 53. The first delay element 51 is arranged between the digital modulator 2 and the first converter 4 and is adapted to delay the digital in-phase signal output from the modulator 2 with a delay defined by the first delay value. Accordingly, the second delay element 52 is arranged between said digital modulator 2 and the second converter 5 and is adapted to delay the digital quadrature signal output from the modulator 2 over the line 8 with a delay defined by the second delay value. Thereby, each of the first and second delay values is greater or equal to zero.

A master clock signal with a frequency that is, in general, a multiple of the digital modulator 2 output signal clock frequency, for example 12 times 52/12 MHz=52 MHz, is fed to the determination unit 48 over the input line 54. The determination unit 48 is described in further detail with reference to FIG. 10.

Figure 10:
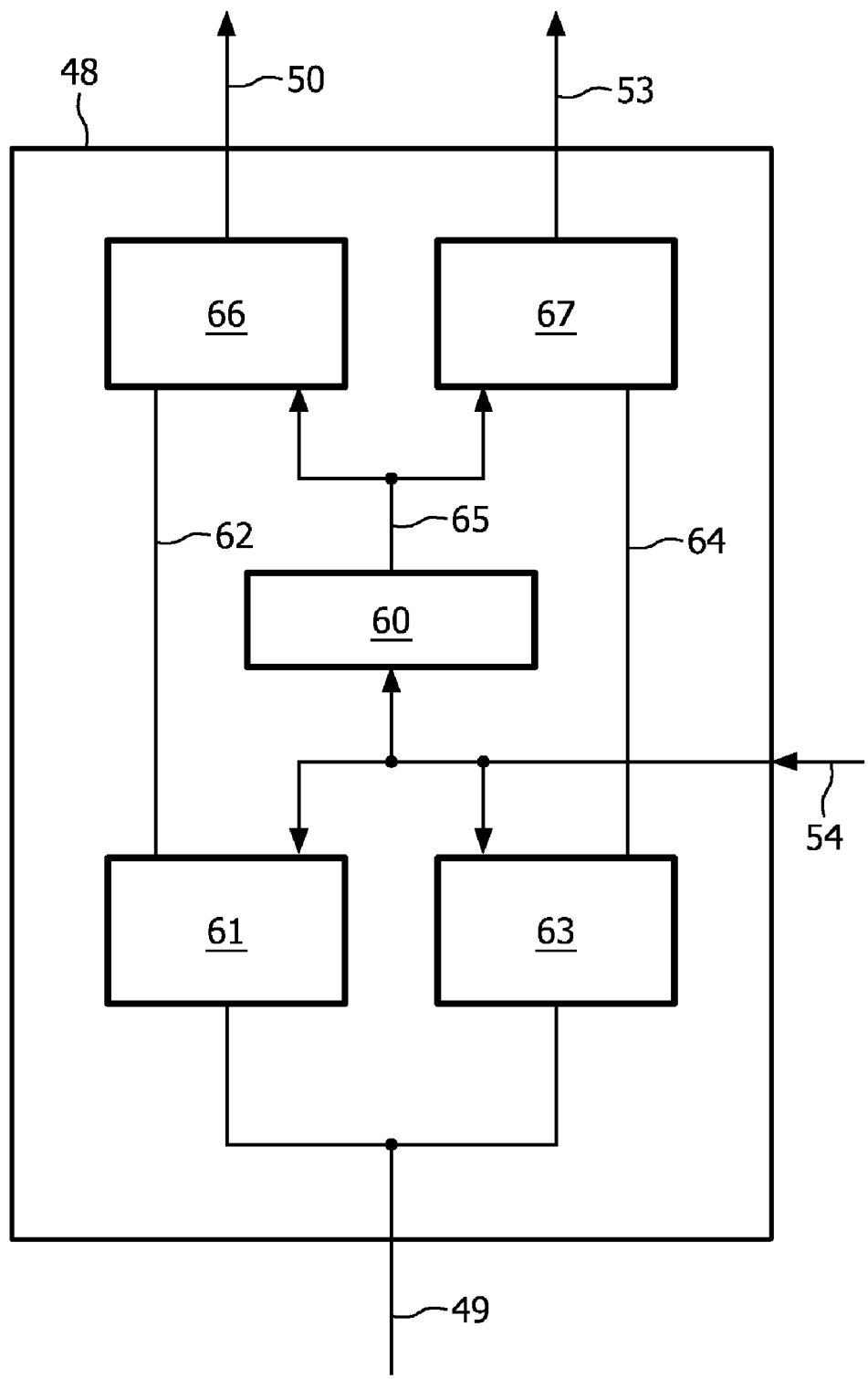
FIG. 10 shows a determination unit of the transmitter device according to FIG. 9.

FIG. 10 shows the determination unit 48 of the transmitter apparatus 1 according to FIG. 9. The determination unit 48 comprises a counter 60 for counting the master clock frequency modulo a value defined by the fraction value of the master clock signal frequency and the digital modulator 2 output signal clock frequency. For example, when the digital modulator 2 output signal clock frequency is 52/12 MHz and the master clock signal frequency is 12 times 52/12 MHz, i.e., 52 MHz, then the counter 60 counts modulo 12.

The determination unit 48 comprises a first calculation element 61 for calculating the fraction value consisting of a numerator which is the product of −1 and the time shift value stored in the memory element 46 and a denominator that is the reciprocal of the frequency of the master clock signal input from line 54. Then, the first calculation element 61 outputs this fraction value, when this fraction value is greater than zero, and outputs a zero value otherwise over a line 62. A second calculation element 63 calculates a fraction value consisting of a numerator that is the time shift value stored in the memory element 46 and a denominator that is the reciprocal of the frequency of the master clock signal input over the input line 54. Then, the second calculation element 63 outputs this fraction value, when this fraction value is greater than zero, and outputs otherwise a zero value over a line 64. The output signal of the counter 60 is applied to a first comparator 66 and a second comparator 67 over a line 65. The first comparator 66 compares the counter signal value from the counter 60 with the output value from the first calculation element 61. If the output signal of the counter 60 is greater or equal to the output from the first calculation element 61, then a delay is set for the first delay element 51, and no delay is set for the first delay element 51 otherwise. When the output signal from the counter 60 is greater or equal than the output of the second calculation element 63, then the second comparator 67 sets a delay value for the second delay element 52, and sets no delay otherwise.

Therewith, it is attained that for positive delays (time shift values), when the quadrature signal advances relative to the in-phase signal without compensation, the bits of the digital in-phase signal are released for a zero value output of the counter 60, and the bits of the digital quadrature signal are released for a counter 60 output that equals the greatest integer that is less than or equal to the fraction value consisting of a numerator that is the time shift value and a denominator that is the reciprocal of the master clock signal frequency so that a delay of an amount that is the product of this fraction value and the reciprocal of the master clock signal frequency is added to the quadrature signal relative to the in-phase signal.

And, for negative delays, when the in-phase signal advances relative to the quadrature signal without compensation, the bits of the digital quadrature signal are released for an output signal of the counter 60 equal to zero and the bits of the digital in-phase signal are released for a counter signal that equals the greatest integer that is less than or equal to the fraction value consisting of a numerator that is the product of −1 and the time shift value and a denominator that is the reciprocal of the master clock signal frequency so that a delay of an amount of this fraction value and the reciprocal of the master clock signal frequency is added to the in-phase signal relative to the quadrature signal.

The granularity of delays which can be introduced according to the preferred embodiment, and thereby the remaining overall path delay mismatch after compensation, is adjustable by the choice of the master clock frequency.

Only for the way of illustration and not limiting the present invention, an example for an attainable performance after compensation is described below. When the master clock signal frequency is set to 52 MHz, the granularity of the delay compensation equals 19.2 ns. Supposing an amplitude swing of 2Vpp on the analog differential signals while using 10-bit digital-to-analog converters, one least significant bit in the digital part of the transmit path represents 2 mVpp. Hence, the maximum amplitude difference between the in-phase path 31 and the quadrature path 34 after compensation equals about 8 mVpp/2=4 mVpp, when assuming a multiplier with an effective resolution of 8 bit. This corresponds to a maximum amplitude mismatch after compensation of 1.002.

With these values and calculating the minimum attainable image rejection for the modulator 2 frequency of 67 kHz, the image rejection after compensation is by far better than 50 dB.

It should be noted that the transmitter devices according to the first, second, third or fourth embodiment can be combined with the transmitter device according to the fifth embodiment. As already mentioned above, the basic elements of the transmitter according to the first to fourth embodiments correspond to the basic elements of the transmitter according to the fifth embodiment. In particular, the transmitter device comprises a digital modulator DM, 2, a digital to audio converter IDAC, 4, and a low pass filter LPF, 11, for the in-phase path and a digital-to-analog converter QDAC, 5 and a low pass filter LPF for the quadrature path. An amplitude correction can be performed by the amplitude correction unit 43 coupled between the digital modulator DM, 2 and the digital to audio converter IDAC, 4 in the in-phase path. A delay mismatch can be compensated by the filter units $H_I$, $H_Q$, 51, 52. While the mismatch compensation according to the fifth embodiment is described according to FIG. 10, the delay mismatch compensation according to the first, second, third or fourth embodiment is described with reference to the FIG. 2, 3 or 4. Accordingly, in all of the embodiments the delay mismatch between the in-phase and quadrature phase path is compensated by delaying the digital in-phase signal relative to the digital quadrature signal or vice versa. This compensation is based on a delay mismatch estimate. According to the first, second, third or fourth embodiment, the compensation is performed based on a first order all-pass filter, while according to the fifth embodiment, two appropriately delayed distinct enable signals are used for latching the in-phase signal or the quadrature signal into the digital-to-analog converter. In all of the embodiments, the method for measuring the delay mismatch according to FIG. 9 can be used to derive the delay mismatch estimate.

According to the first embodiment, the delay mismatch between the baseband paths of the in-phase and quadrature transmit signal is compensated by delaying the digital in-phase (quadrature) signal relative to the digital quadrature (in-phase) signal according to a delay mismatch estimate and in particular quantized version thereof. According to the second embodiment, the delay mismatch is compensated by a tunable first order all-pass IIR filter section and a ROM table is provided to select the predetermined filter coefficients. Alternatively, a RAM table is provided to store filter coefficients calculated off chip. According to a third embodiment, the compensation of the delay mismatch is based on a tunable first FIR filter section with a length L which corresponds to an impulse response approximation of the IIR all-pass filter. As in the second embodiment, a ROM table or a RAM table is provided. According to the fourth embodiment, a polar loop modulator is implemented wherein the delay mismatch is compensated by delaying the digital phase signal relative to the digital amplitude signal according to a delay mismatch estimate and in particular the quantized version thereof.

Although a transmitter device has been described in the first to fifth embodiment the basic principles of the invention are not restricted to such a device. For example, the above described compensation of delay mismatch between a two signal by means of the filter units and the table unit can also be applied to any electronic signaling devices or electronic communication device which have an analog and a digital part, wherein circuits in the analog part may introduce a delay mismatch which in turn is compensated in the digital part by adjusting the filter value of the filters according to a determined delay mismatch as described according to the first, second third or fourth embodiment. Accordingly, a modulator is not required in such a device.

It should be noted that the above-mentioned embodiments illustrate rather than limit the invention, and that those skilled in the art will be able to design many alternative embodiments without departing from the scope of the appended claims. In the claims, any reference signs placed between parentheses shall not be construed as limiting the claim. The word "comprising" does not exclude the presence of elements or steps other than those listed in a claim. The word "a" or "an" preceding an element does not exclude the presence of a plurality of such elements. In the device claim enumerating several means, several of these means can be embodied by one and the same item of hardware. The mere fact that certain measures are recited in mutually different dependent claims does not indicate that a combination of these measures cannot be used to advantage.

Furthermore, any reference signs in the claims shall not be construed as limiting the scope of the claims.

The invention claimed is:

1. A transmitter device, comprising:
    a digital part and an analog part;
    a digital modulator arranged in the digital part and configured to receive bits and digitally modulate the received bits;
    a first digital-to-analog converter and a second digital-to-analog converter;

a digital filter unit arranged in the digital part and coupled between the digital modulator and one of the first and second digital-to-analog converters; and a table unit coupled to the digital filter unit and configured to store pre-defined compensation filter values for the digital filter unit, the compensation filter values being configured to compensate different analog delay mismatches;

wherein the digital filter unit is configured to receive from the table unit selected compensation filter values of the compensation filter values stored in the table unit, the selected compensation filter values corresponding to a determined delay mismatch of the analog part.

2. A transmitter device according to claim 1, wherein:

said digital modulator is configured to receive a digital signal and to output a digital in-phase signal and a digital quadrature signal;

said first digital-to-analog converter is configured to convert said digital in-phase signal to an analog in-phase signal, and said second digital-to-analog converter is adapted to convert said digital quadrature signal to an analog quadrature signal.

3. A transmitter device according to claim 2, wherein:

the digital filter unit comprises a first order all-pass filter with a pole and zero constellation, which is tunable according to the compensation filter values stored in the table unit.

4. A transmitter device according to claim 3, further comprising:

a delay selector unit coupled to the table unit and configured to provide the delay mismatch of the analog part of the transmitter device.

5. A transmitter device according to claim 1, wherein:

the digital modulator is configured to receive a digital signal and output a digital amplitude signal and a digital phase signal;

said first digital-to-analog converter is configured to convert said digital amplitude signal to an analog amplitude signal; and said second digital-to-analog converter is configured to convert said digital phase signal to an analog phase signal, wherein the digital filter unit is coupled between the digital phase output and the second digital-to-analog converter.

6. Transmitter device according to claim 5, wherein:

the digital filter unit comprises a first order all-pass filter with a pole and zero constellation, which is tunable according to the compensation filter values stored in the table unit.

7. Transmitter device according to claim 6, further comprising:

a delay selector unit coupled to the table unit for providing the delay mismatch of the analog part of the transmitter device.

8. A method for controlling a transmitter device, wherein the transmitter device comprises a digital and an analog part, a digital modulator, first and second digital-to-analog converters and a filter unit coupled between the digital modulator and one of the first and second digital-to-analog converters, the method comprising:

digitally modulating received bits;

storing in a table unit pre-defined compensation filter values configured to compensate for different analog delay mismatches; and providing to the filter unit selected compensation filter values of the stored compensation filter values, the selected compensation filter values corresponding to a determined delay mismatch of the analog part.

9. A method according to claim 8, wherein the delay mismatch in the analog part of the transmitter device is determined by:

feeding a first digital test signal to the digital modulator of the transmitter device, converting, to a digital in-phase test signal, an analog in-phase test signal output from said transmitter device based on said first digital test signal, feeding a second digital test signal to said modulator, wherein said further predetermined digital test signal comprises a same bit stream as said first digital test signal, converting, to a digital quadrature test signal, an analog quadrature test signal output from said transmitter device based on said second digital test signal, measuring a time shift between said digital in-phase test signal and said digital quadrature signal, and determining a delay value for correcting a time shift between an analog part of a path of said transmitter device for an in-phase signal and a path of said transmitter device for a quadrature signal based on said time shift measured.

10. A transmitter device, comprising:

a digital part and an analog part;

a digital modulator arranged in the digital part and configured to receive bits and digitally modulate the received bits;

a first digital-to-analog converter and a second digital-to-analog converter;

a digital filter unit arranged in the digital part and coupled between the digital modulator and one of the first and second digital-to-analog converters;

a table unit coupled to the digital filter unit and configured to store pre-defined compensation filter values for the digital filter unit, the compensation filter values being configured to compensate different analog delay mismatches; and means for determining a delay mismatch of the analog part and providing the determined delay mismatch to the table unit, wherein the digital filter unit is configured to receive from the table unit selected compensation filter values of the compensation filter values stored in the table unit, the selected compensation filter values corresponding to the determined delay mismatch of the analog part.

11. A transmitter device according to claim 10, wherein:

said digital modulator is configured to receive a digital signal and to output a digital in-phase signal and a digital quadrature signal;

said first digital-to-analog converter is configured to convert said digital in-phase signal to an analog in-phase signal, and said second digital-to-analog converter is adapted to convert said digital quadrature signal to an analog quadrature signal.

12. A transmitter device according to claim 10, wherein:

the digital filter unit comprises a first order all-pass filter with a pole and zero constellation, which is tunable according to the compensation filter values stored in the table unit.

13. A transmitter device according to claim 12, further comprising:

a delay selector unit coupled to the table unit and configured to provide the delay mismatch of the analog part of the transmitter device.

14. A transmitter device according to claim 10, wherein:

the digital modulator is configured to receive a digital signal and output a digital amplitude signal and a digital phase signal;

said first digital-to-analog converter is configured to convert said digital amplitude signal to an analog amplitude signal; and said second digital-to-analog converter is configured to convert said digital phase signal to an analog phase signal, wherein the digital filter unit is coupled between the digital phase output and the second digital-to-analog converter.

15. Transmitter device according to claim 14, wherein:

the digital filter unit comprises a first order all-pass filter with a pole and zero constellation, which is tunable according to the compensation filter values stored in the table unit.

* * * * *

UNITED STATES PATENT AND TRADEMARK OFFICE
CERTIFICATE OF CORRECTION

PATENT NO. : 8,094,054 B2
APPLICATION NO. : 12/678010
DATED : January 10, 2012
INVENTOR(S) : Markus Helfenstein et al.

It is certified that error appears in the above-identified patent and that said Letters Patent is hereby corrected as shown below:

Col. 4, line 4: change "mismatch it is assume" to --mismatch it is assumed--

Col. 4, line 26 (EQ3, line 1): change " $I(t)\backslash I(t)=2A\cos(2\pi f_{I/Q}t,$ " to -- $I(t)\backslash I(t)=2A\cos(2\pi f_{I/Q}t),$ --

Col. 5, line 65 (EQ14, line 2): change " $C = (1 - G\cos(\Delta\phi)) + jG\sin(\Delta\phi))/2.$ " to -- $C = (1 - G\cos(\Delta\phi) + jG\sin(\Delta\phi))/2.$ --

Col. 8, line 61 (EQ24, line 1): change " $r[k] = \sqrt{(I[k])^2 + (Q[k])^2}$ " to -- $r[k] = \sqrt{(I[k])^2 + (Q[k])^2}$ --

Col. 10, line 45: change "or the analog quadrature signal to an further analog" to --or the analog quadrature signal to a further analog--

Col. 12, line 19: change "With this estimates..." to --With these estimates--

Col. 12, line 46: change "not greater than two times this frequency," to --not greater than two times this frequency.--

Col. 13, line 12: change "norm, for example, as one or two," to --norm, for example, as one or two.--

Signed and Sealed this
Twenty-eighth Day of August, 2012

David J. Kappos
*Director of the United States Patent and Trademark Office*